(12) United States Patent
Joung et al.

(10) Patent No.: US 9,863,575 B2
(45) Date of Patent: Jan. 9, 2018

(54) LOCKING-UNLOCKING STRUCTURE FOR STOPPING LIFTING BODY, WHICH IS LIFTED AND FALLEN THROUGH REPETITION OF PUSHING ACTIONS, IN LIFTING STATE AND FOR RELEASING STOPPING STATE OF LIFTING BODY

(71) Applicants: WhiDong Joung, Hwaseong-si (KR); MICROFILTER Co., Ltd, Chungcheongbuk-do (KR)

(72) Inventors: WhiDong Joung, Hwaseong-si (KR); Jaelk Lee, Cheongju-si (KR); PilKang Hwang, Jincheon-gun (KR)

(73) Assignee: MICROFILTER Co., Ltd., Jincheon-gun (KR)

( * ) Notice: Subject to any disclaimer, the term of this patent is extended or adjusted under 35 U.S.C. 154(b) by 43 days.

(21) Appl. No.: 15/072,083

(22) Filed: Mar. 16, 2016

(65) Prior Publication Data
US 2016/0271538 A1   Sep. 22, 2016

(30) Foreign Application Priority Data
Mar. 16, 2015  (KR) ........................ 10-2015-0036195

(51) Int. Cl.
*B01D 35/30* (2006.01)
*F16M 13/00* (2006.01)
*B01D 27/00* (2006.01)

(52) U.S. Cl.
CPC .............. *F16M 13/00* (2013.01); *B01D 35/30* (2013.01); *B01D 2201/302* (2013.01);
(Continued)

(58) Field of Classification Search
CPC ...... B01D 35/30; B01D 35/306; B01D 35/00; B01D 2201/4007; B01D 2201/302;
(Continued)

(56) References Cited

U.S. PATENT DOCUMENTS

| | | | | |
|---|---|---|---|---|
| 4,569,281 A | * | 2/1986 | Woods .................... | B30B 9/321 100/103 |
| 8,097,156 B2 | * | 1/2012 | Tubby .................... | B01D 29/96 210/232 |

(Continued)

FOREIGN PATENT DOCUMENTS

KR  10-1570188 B1  11/2015

*Primary Examiner* — Tan Le
(74) *Attorney, Agent, or Firm* — Jefferson IP Law, LLP

(57) ABSTRACT

A locking-unlocking structure for stopping a lifting body, which is vertically lifted and falls through repetition of a pushing action, in a lifting state and for releasing a stopping state of the lifting body is provided. The locking-unlocking structure includes a lifting body, which is exactly lifted immediately upward, or falls without being fluctuated left and right and, to control lifting and falling operations of the lifting body, an actuation unit is mounted in the lifting body movably left and right, and an actuation guide unit, which guides an operation of the actuation unit, is fixedly mounted in a fixing body, and the lifting body is provided therein with a rotation groove allowing the actuation unit to be movable left and right when the lifting body is lifted or falls, and a rotation shaft rotatably coupled to the rotation groove is provided at one side of a lifting plate. The lifting plate is provided on a lower end of an opposite side thereof with a stop protrusion circulating a lifting line and a falling line branching left and right. The actuation guide unit, which is configured to guide an operation of the actuation unit, includes the lifting line having a rising curve line and the falling line having a falling curve line, the lifting line and the falling line branching left and right at a lower end of the actuation guide unit, to guide repeatedly circulating operations of the actuation unit. The actuation guide unit is provided at a central upper portion thereof with a stop groove interposed between the lifting line and the falling line to securely mount the stop protrusion in the stop groove.

14 Claims, 12 Drawing Sheets

(52) U.S. Cl.
CPC .............. *B01D 2201/4007* (2013.01); *C02F 2201/004* (2013.01); *C02F 2201/006* (2013.01); *F16M 2200/028* (2013.01)

(58) Field of Classification Search
CPC ............. F16M 13/00; F16M 2200/028; C02F 2201/004; C02F 2201/006
USPC ........ 210/136, 153, 234, 236; 248/651, 655, 248/658
See application file for complete search history.

(56) References Cited

U.S. PATENT DOCUMENTS

| | | | | |
|---|---|---|---|---|
| 9,233,322 | B1* | 1/2016 | Huda | B01D 29/96 |
| 2011/0139698 | A1* | 6/2011 | Freystedt | B01D 35/147 |
| | | | | 210/232 |
| 2011/0174705 | A1* | 7/2011 | Branscomb | B01D 35/153 |
| | | | | 210/153 |
| 2016/0271536 | A1* | 9/2016 | Joung | B01D 27/00 |
| 2016/0271537 | A1* | 9/2016 | Joung | F16M 13/00 |
| 2016/0271538 | A1* | 9/2016 | Joung | F16M 13/00 |

* cited by examiner

LOCKING-UNLOCKING STRUCTURE FOR STOPPING LIFTING BODY, WHICH IS LIFTED AND FALLEN THROUGH REPETITION OF PUSHING ACTIONS, IN LIFTING STATE AND FOR RELEASING STOPPING STATE OF LIFTING BODY

CROSS REFERENCE TO RELATED APPLICATION(S)

This application claims the benefit under 35 U.S.C. § 119(a) of a Korean patent application filed on Mar. 16, 2015 in the Korean Intellectual Property Office and assigned Serial number 10-2015-0036195, the entire disclosure of which is hereby incorporated by reference.

BACKGROUND OF THE INVENTION

1. Field of the Invention

The present invention relates to a locking-unlocking structure capable of repeatedly performing a stopping function for a lifting body in a lifting state and a falling function for the lifting body by releasing the stopping state of the lifting body as pushing actions are only repeated in the case that a filter cartridge to be replaced or various articles (lifting body), which require lifting (including falling), are lifted through repeatedly pushing actions in a water purification system.

2. Description of the Related Art

Recently, in a structure employed in the case that a lifting body lifted or falling through repeatedly pushing actions is stopped in a lifting state, or falls through the releasing from the stopping state by a re-pushing action, stopping and falling by releasing from the stopping state are tried through pressing in a ball-point pen scheme that a button is repeatedly pressed, and a latch scheme that an actuator is moved left and right by pushing the lifting body.

Regarding disadvantages of the above structure, according to the ball-point pen scheme, the maintaining of the lifting state and the falling resulting from the releasing of the lifting state are performed by engaging teeth, which are formed mutually corresponding to each other in a fixing body and an actuation body, with each other or offsetting the teeth from each other.

However, the engagement of the teeth may be easily released by great force.

In addition, according to the latch scheme, even though the problem related to the releasing of the engagement of the teeth is solved, the engagement of the teeth may not be exactly achieved by the play of a latch unit occurring as the latch unit is moved left and right.

SUMMARY OF THE INVENTION

The present invention is to provide a lifting body repeatedly lifted and falling with flexibility in a fixing body, exactly repeating lifting and falling operations, and easily manufactured (simplified in the structure thereof and easily assembled).

To this end, when a lifting body is lifted and falls in a fixing body, an actuation unit constituting a locking-unlocking unit is mounted in a lifting body, and an actuation guide unit coupled to the actuation unit is mounted in a fixing body. In this state, as the actuation unit circulates along a lifting line and a falling line of the actuation guide unit, the stopping the lifting body in a lifting state is performed through a pushing action and the falling of the lifting body is performed by releasing the stopping state through a re-pushing action.

In addition, the actuation unit circulating between the lifting line and the falling line of the actuation guide unit is instantly and exactly released from the stopping state due to the elasticity of an elastic rod lifted and falling together with the actuation unit.

In addition, a structure coupled to the actuation unit is simply configured so that the actuation unit is lifted and falls together with the lifting body at the same time.

Further, in the case that the actuation unit is lifted along the lifting line and stopped, the actuation unit may pass a stop groove without being stopped. The actuation unit can be exactly stopped in the stop groove using an anti-passing unit.

Further, in order to form an exact lifting line and lift the lifting plate of the actuation unit immediately upward, a lifting protrusion is formed on the lifting plate, and a lifting groove into which the lifting protrusion is inserted is formed in an actuation guide unit.

As described above, the locking-unlocking unit is configured in a simple structure, so that the locking-unlocking unit can be easily manufactured. While circulating between the lifting line and the falling line, the lifting of the locking-unlocking unit is stopped, and the locking-unlocking unit is released from the stopping state to fall, so that exact repetition actuations are possible, failure may not be caused, and a repair work can be simply performed in failure.

DETAILED DESCRIPTION OF THE INVENTION

Hereinafter, the present invention will be described in detail with reference to accompanying drawings.

Figure 1:
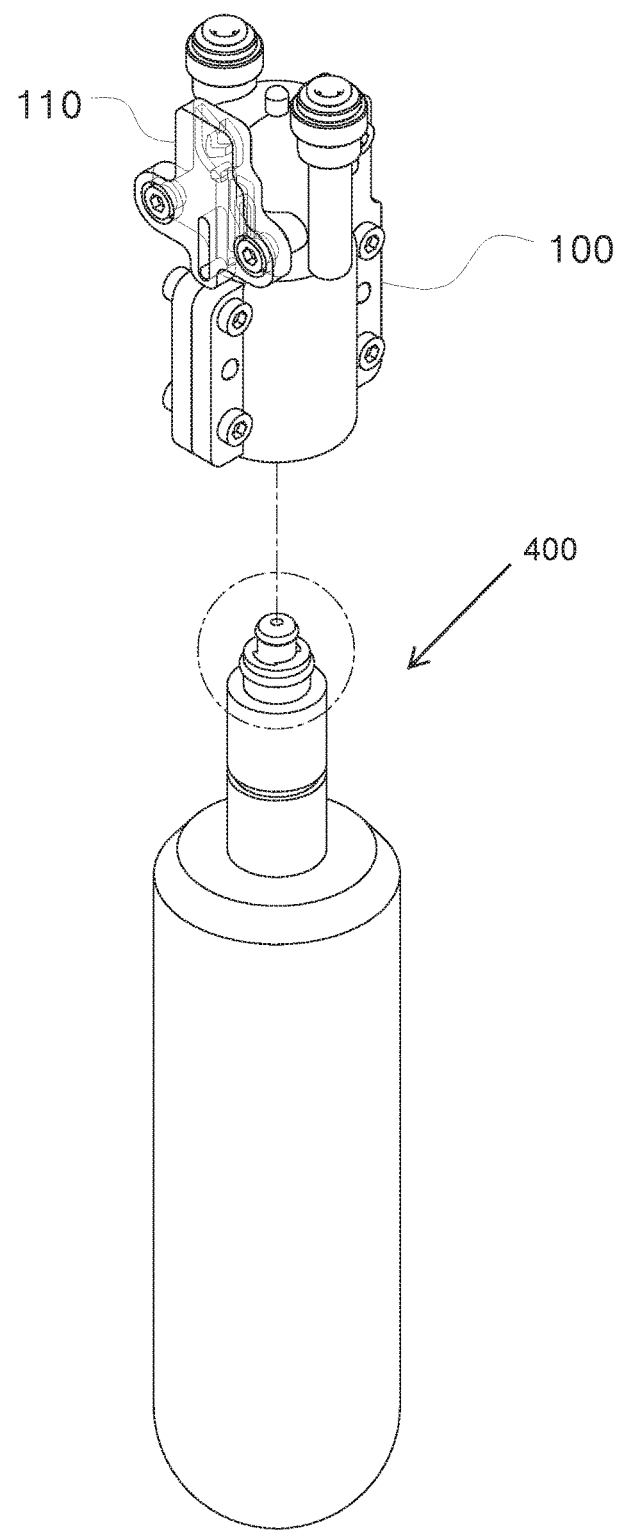
FIG. 1 is a perspective view according to one embodiment of the present invention.
Figure 2:
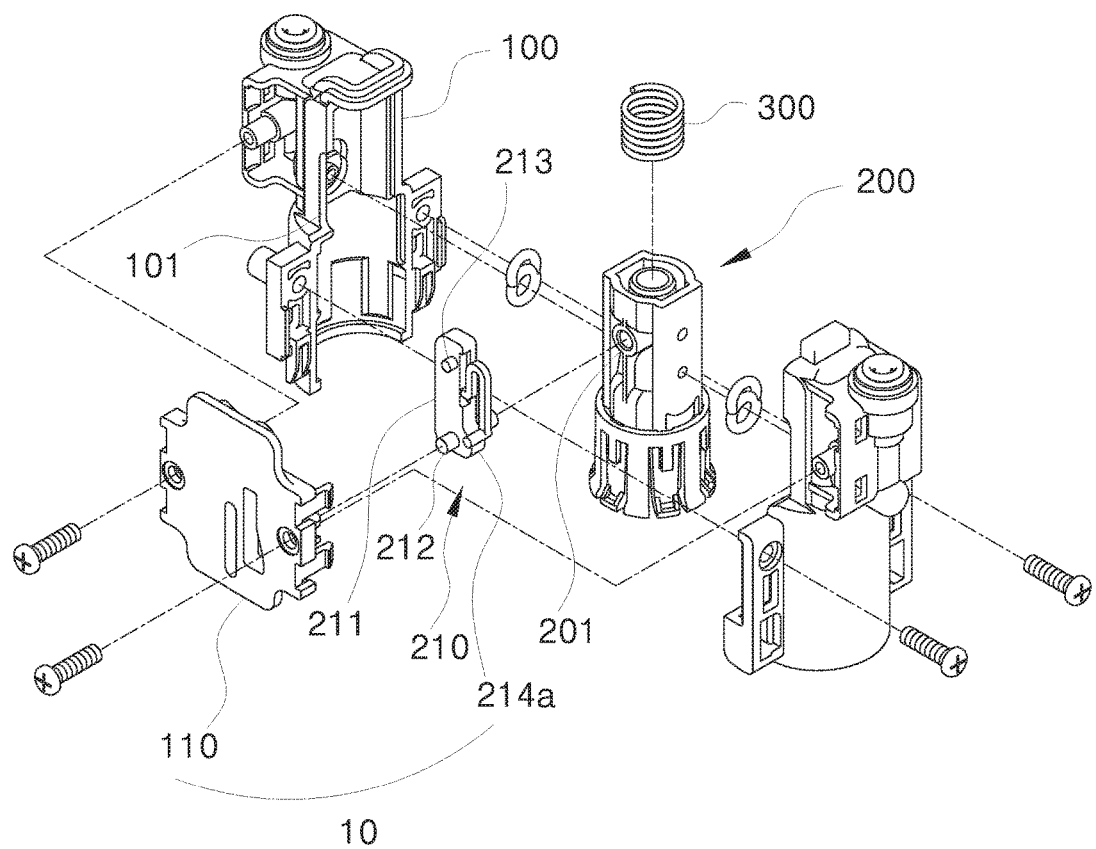
FIG. 2 is a perspective view showing an actuation unit mounted in a lifting body according to one embodiment of the present invention.

FIGS. 1 and 2 are views showing a locking-unlocking unit according to one embodiment of the present invention.

A locking-unlocking unit 10 includes an actuation unit 210 and an actuation guide unit 110. The actuation unit 210 is mounted in a lifting body 200 lifted and falling (moved up and down) by, for example, pushing and pulling actions of a filter cartridge 400, and the actuation guide unit 110 is fixedly mounted in a fixing body 100.

In addition, the lifting body 200 may be mounted in the fixing body 100 and lifted as described above, and the actuation unit 210 in the lifting body 200 and the actuation guide unit 110 in the fixing body 100 may be engaged with each other not to be arbitrarily separated from each other when the actuation unit 210 performs a circulation operation in the actuation guide unit 110.

As described in detail below, in the locking-unlocking unit 10, the actuation unit 210 is movably mounted in the lifting body 200, and the actuation guide unit 110 is fixedly mounted in the fixing body 100. In this state, stopping, maintaining in the stopping state, and falling resulting from the releasing of the stopping state as pushing is performed again in the maintaining state of the stopping state are controlled.

The configuration according to the present invention can be easily manufactured (that is, the configuration can be simplified and easily assembled), and allows actions to be exactly repeated. In addition, failure causes can be overcome by the simple configuration.

Figure 3:
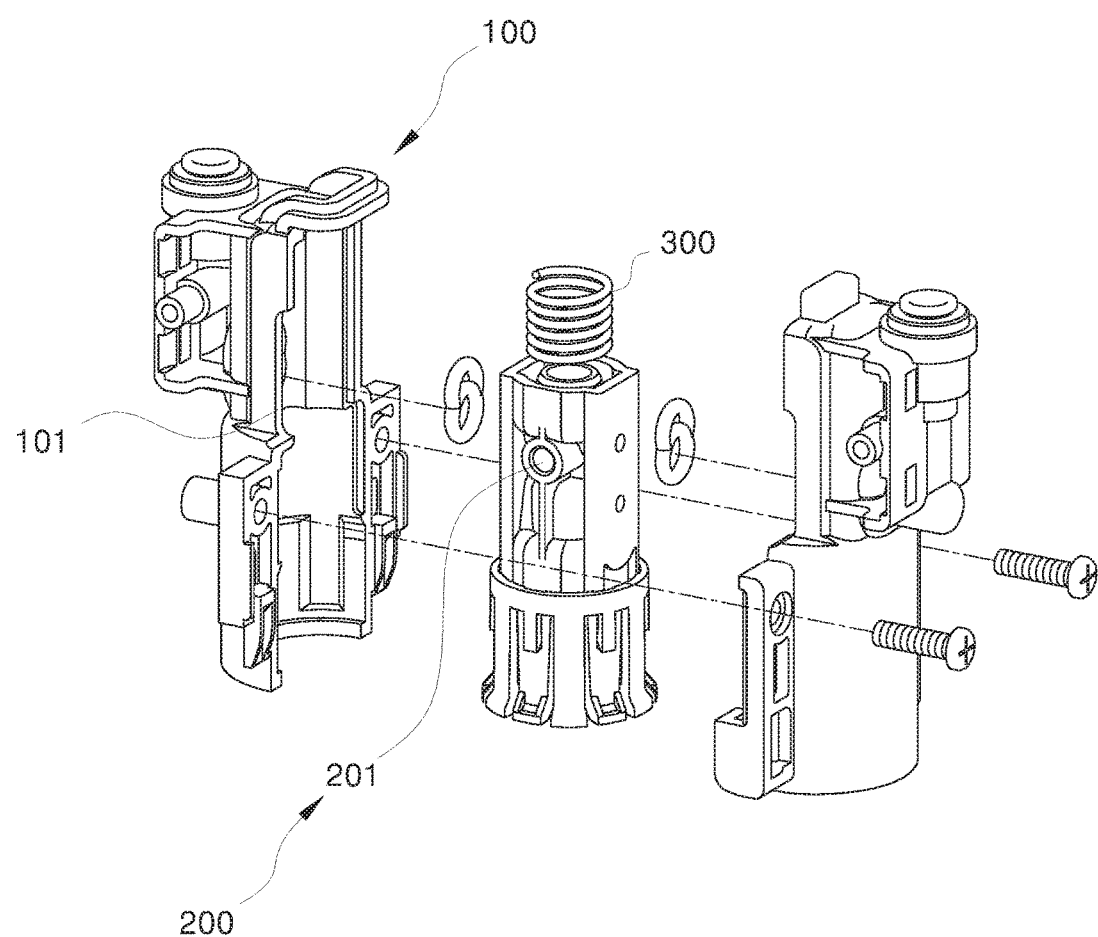
FIG. 3 is a perspective view showing the lifting body mounted in a fixing body according to one embodiment of the present invention.
Figure 4:
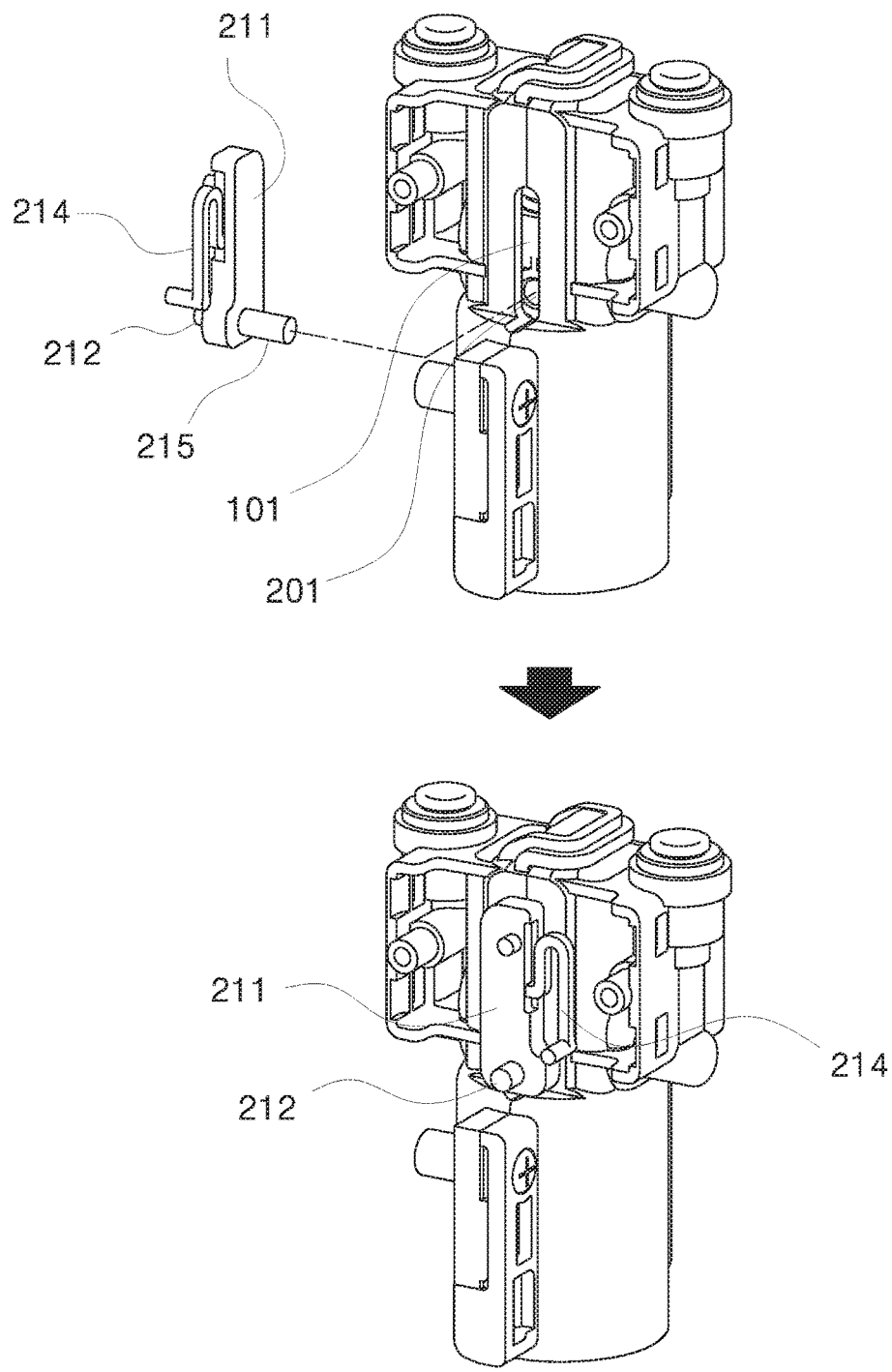
FIG. 4 is a view showing a lifting plate fitted into the actuation unit according to the present invention.
Figure 5:
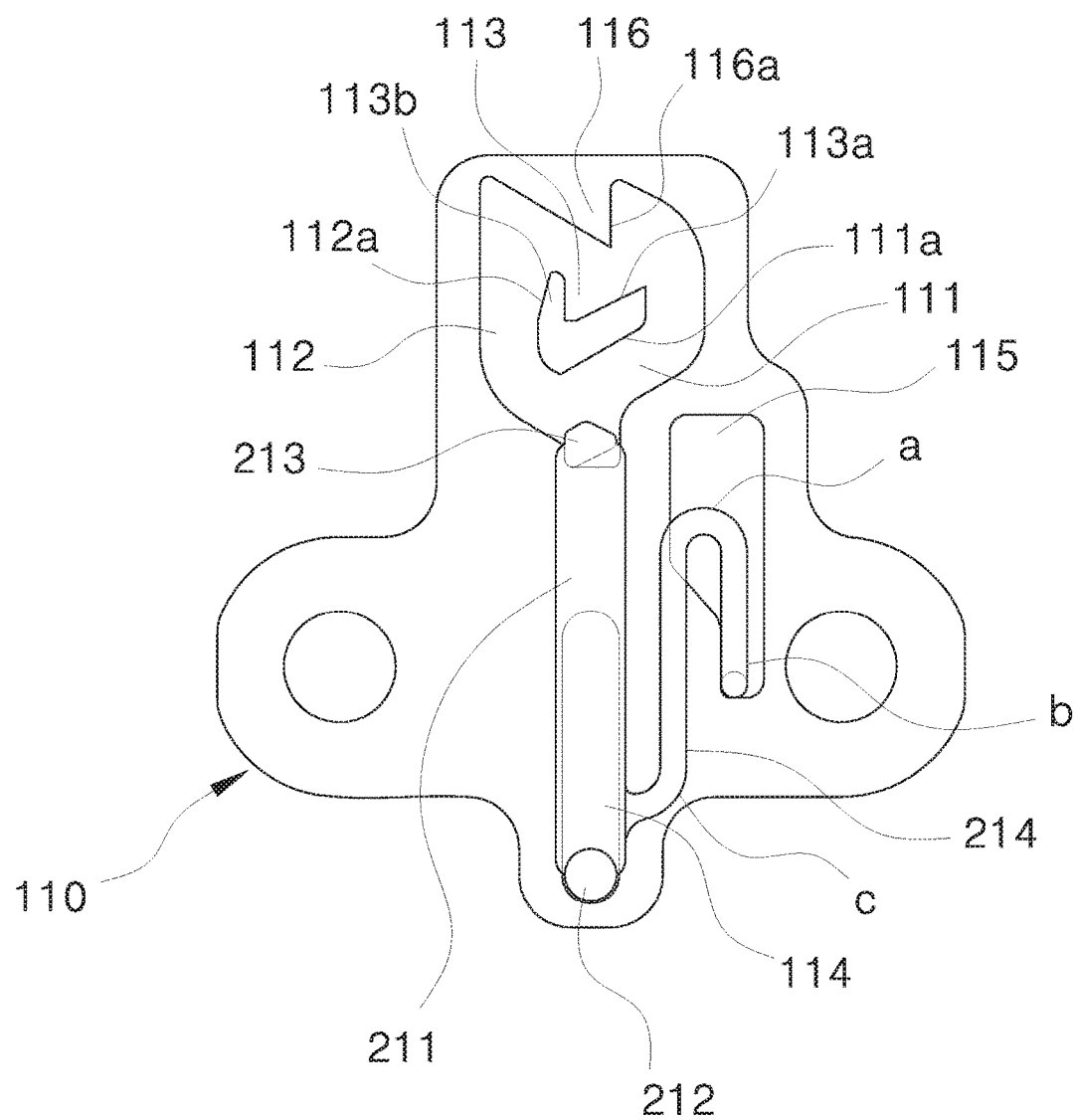
FIG. 5 is a view showing an actuation guide unit engaged with the actuation unit according to the present invention.
Figure 6:
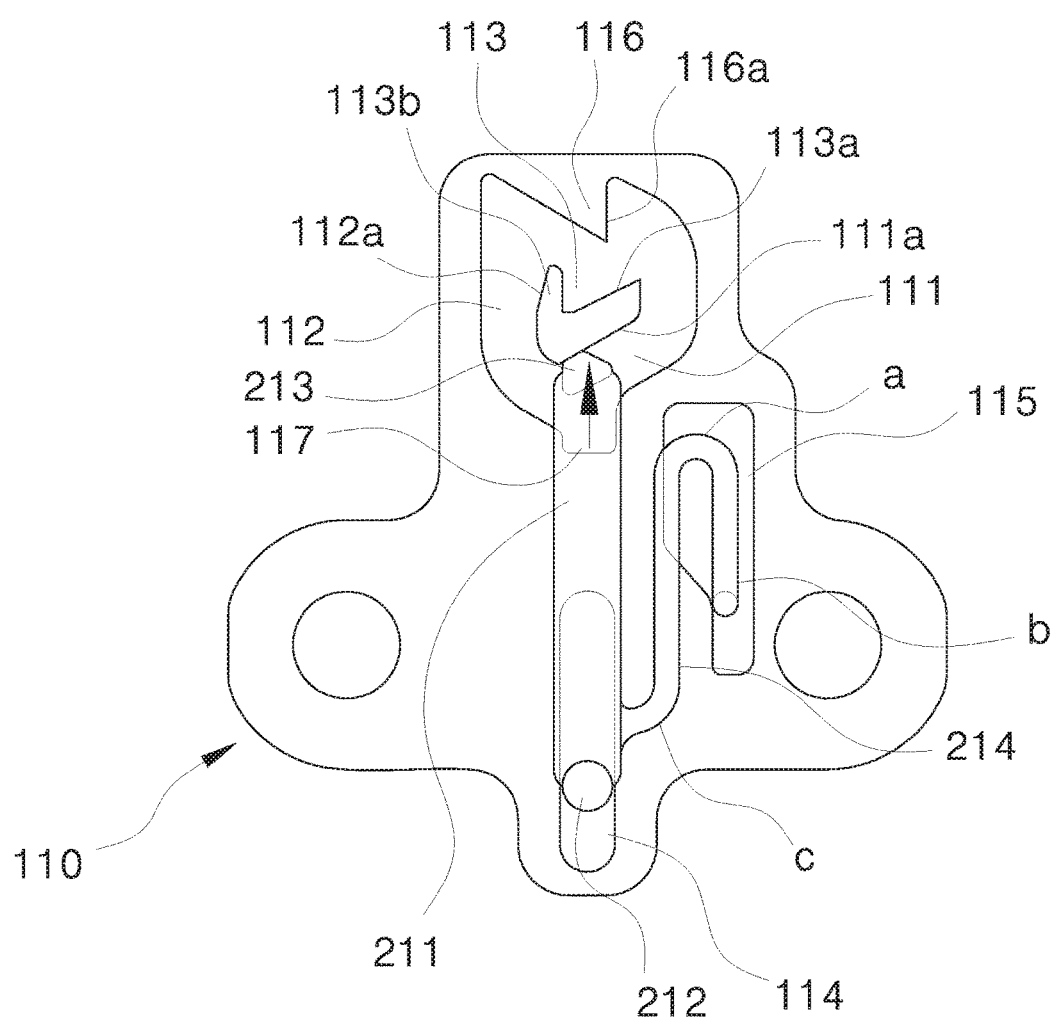
FIG. 6 is a view showing an entrance state of a stop protrusion into a lifting line according to the present invention.
Figure 7:
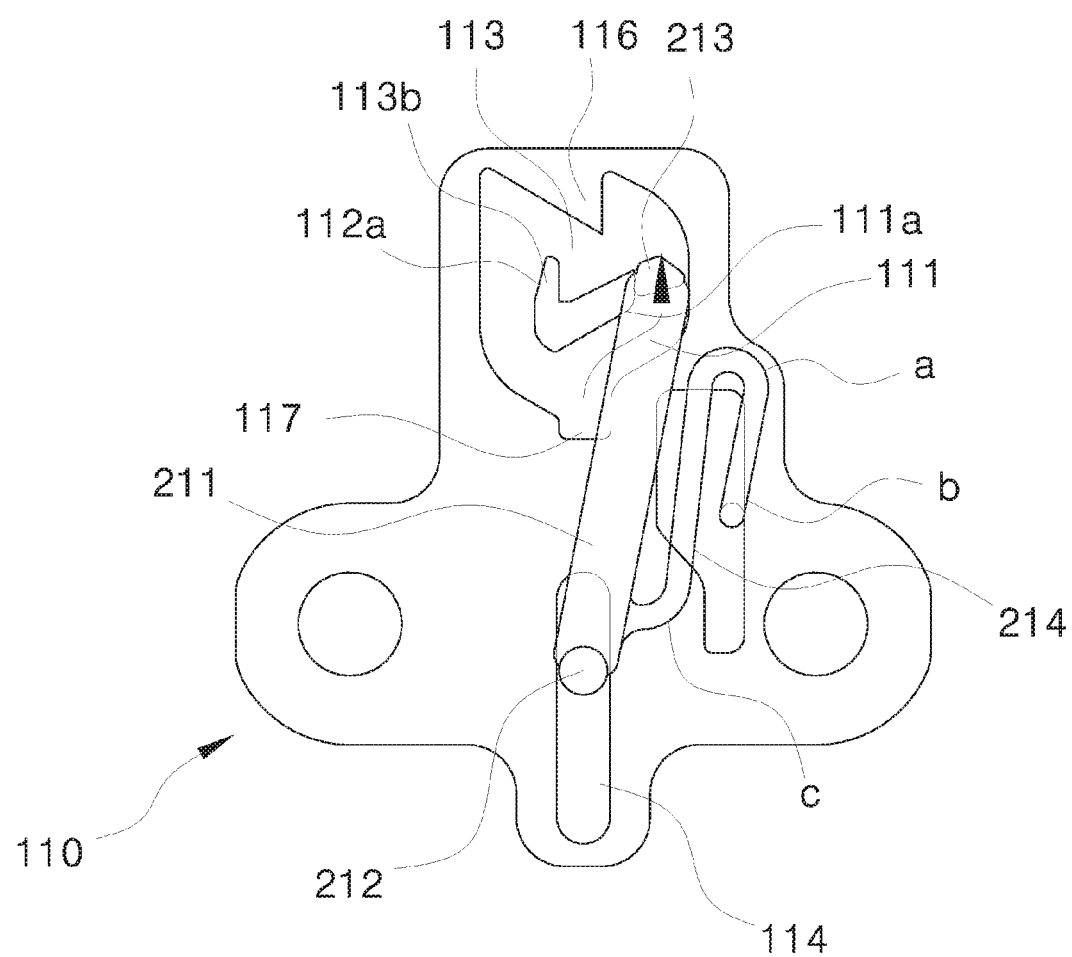
FIG. 7 is a view showing a deviation state of the stop protrusion from the lifting line according to the present invention.
Figure 8:
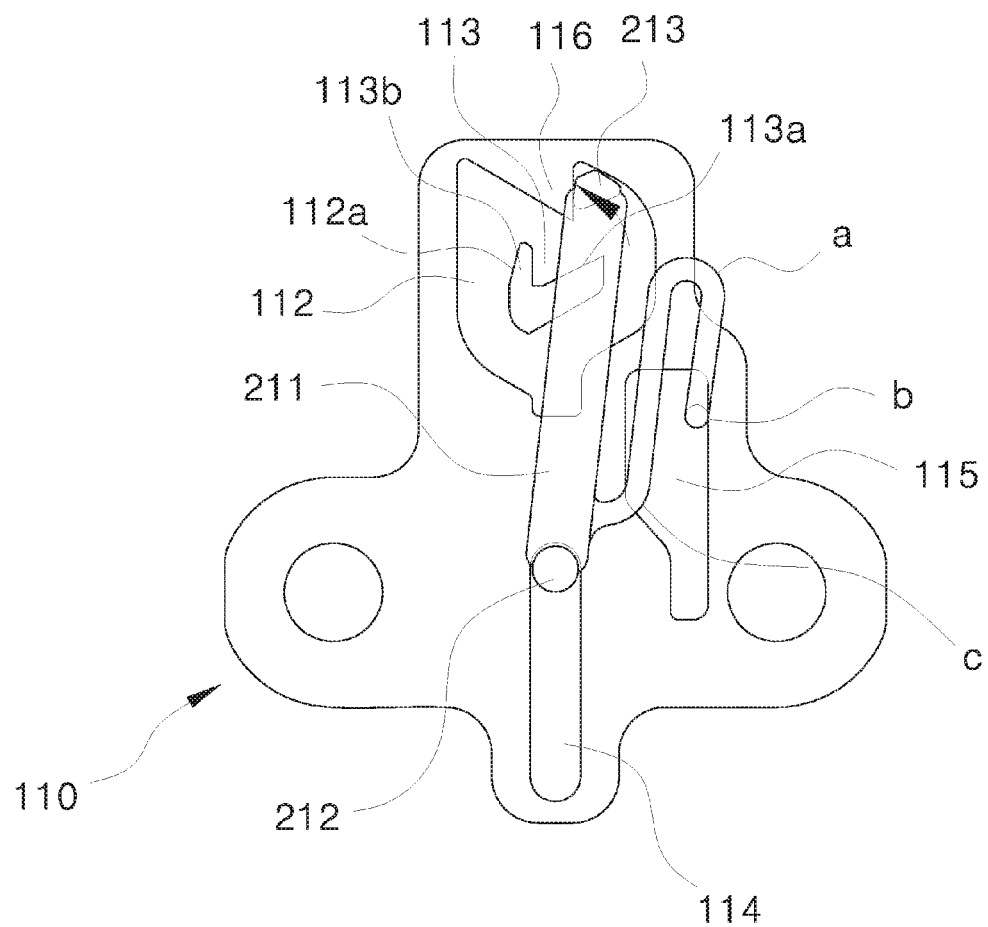
FIG. 8 is a view showing the stop protrusion colliding with an anti-passing protrusion to fall according to the present invention.
Figure 9:
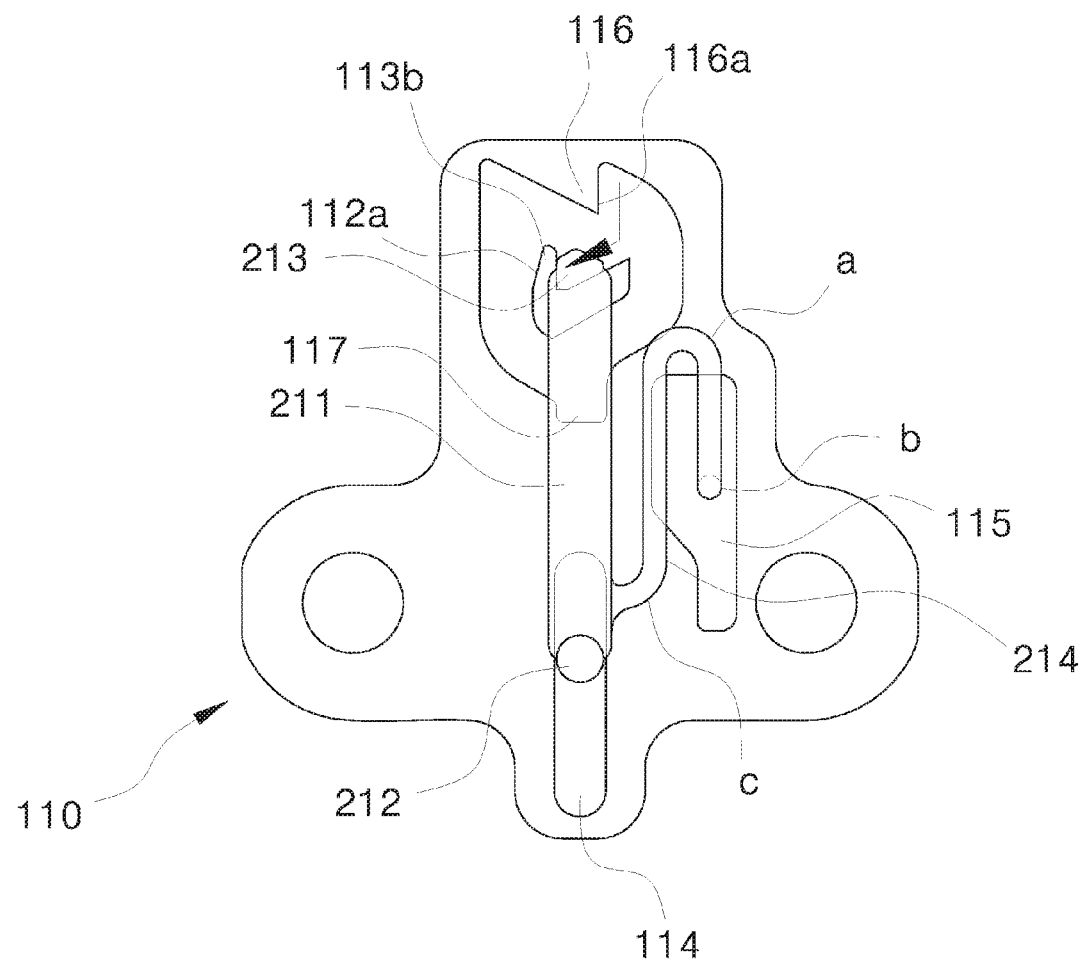
FIG. 9 is a view showing the stop protrusion mounted in a stop groove according to the present invention.
Figure 10:
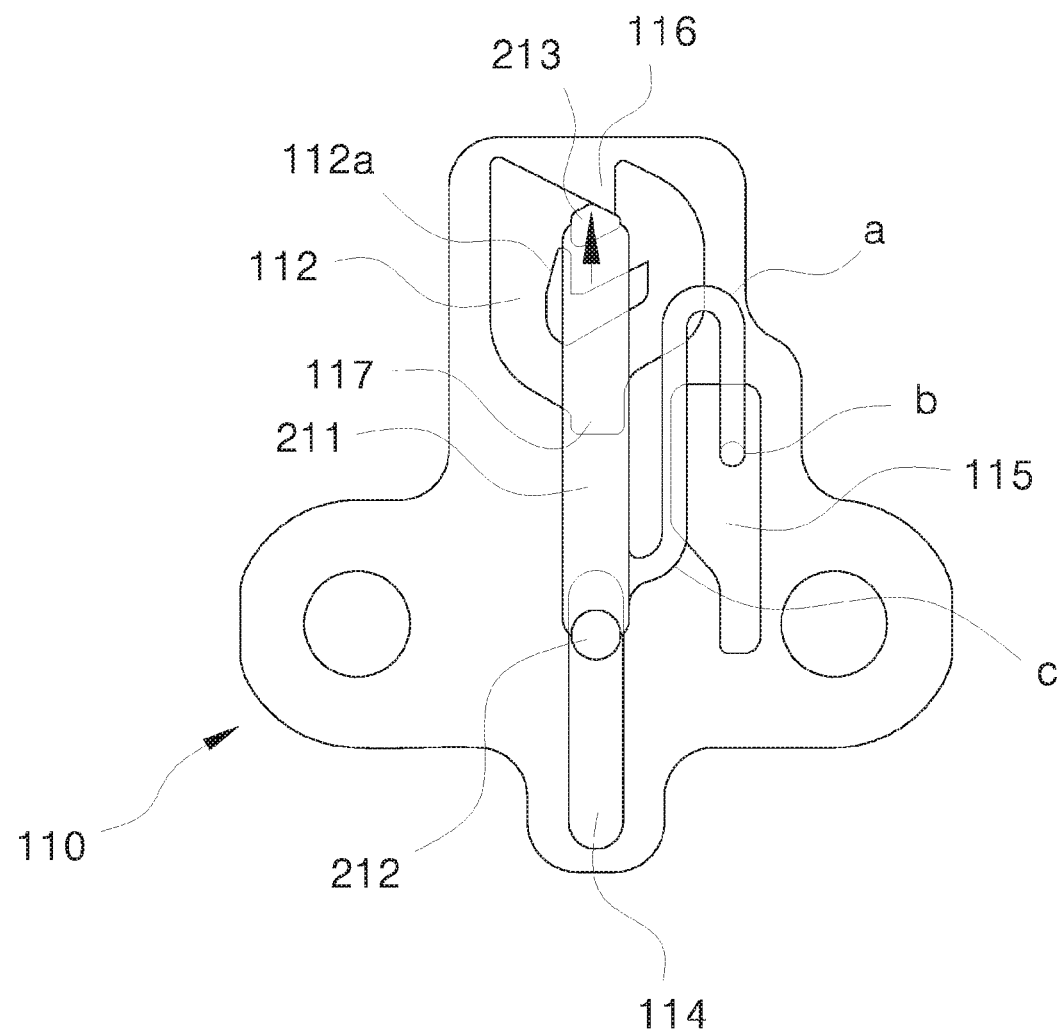
FIG. 10 is a view showing the strop protrusion starting the deviation from the stop groove according to the present invention.
Figure 11:
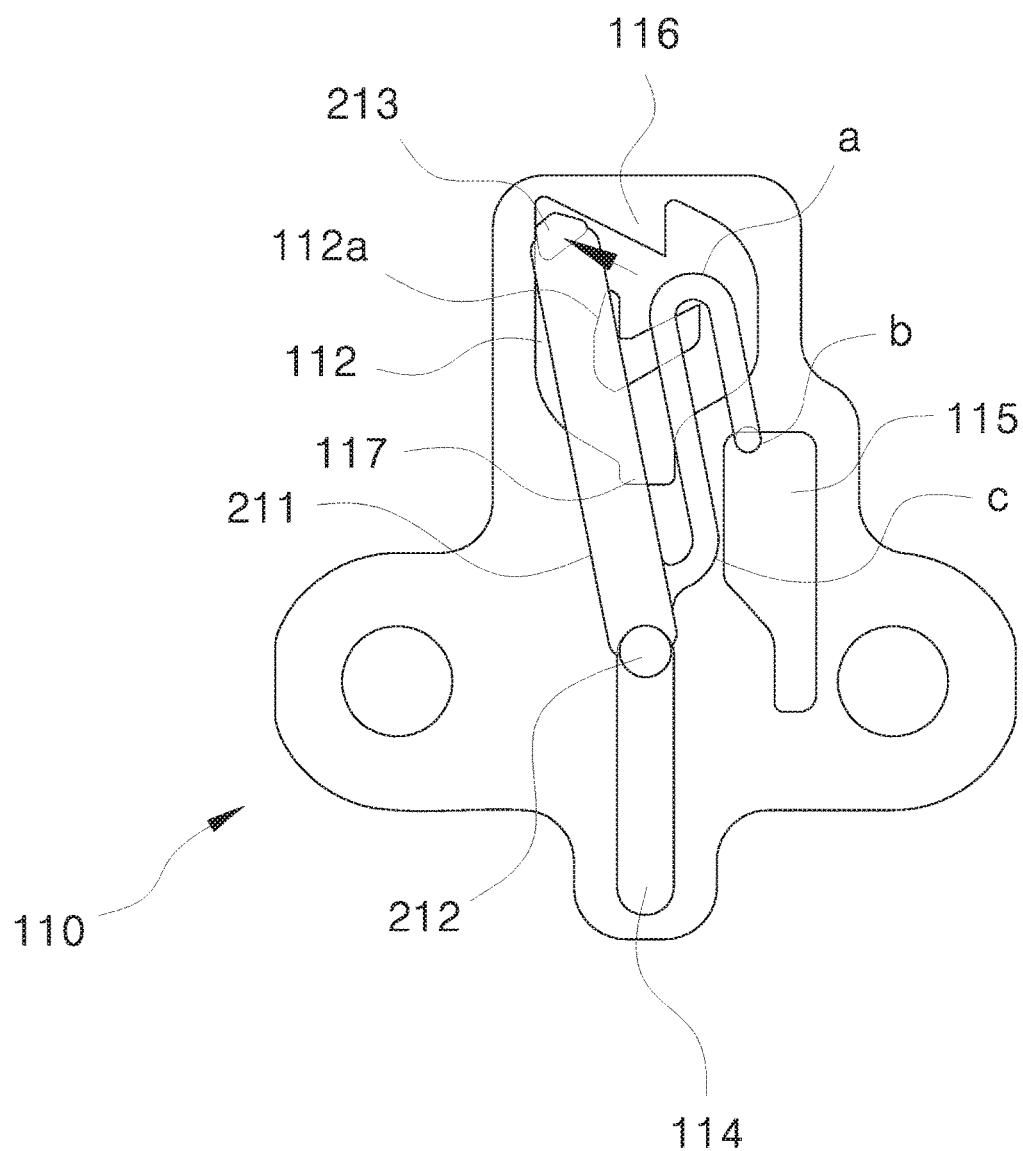
FIG. 11 is a view showing the stop protrusion deviating from the stop groove and falling along a falling line.
Figure 12:
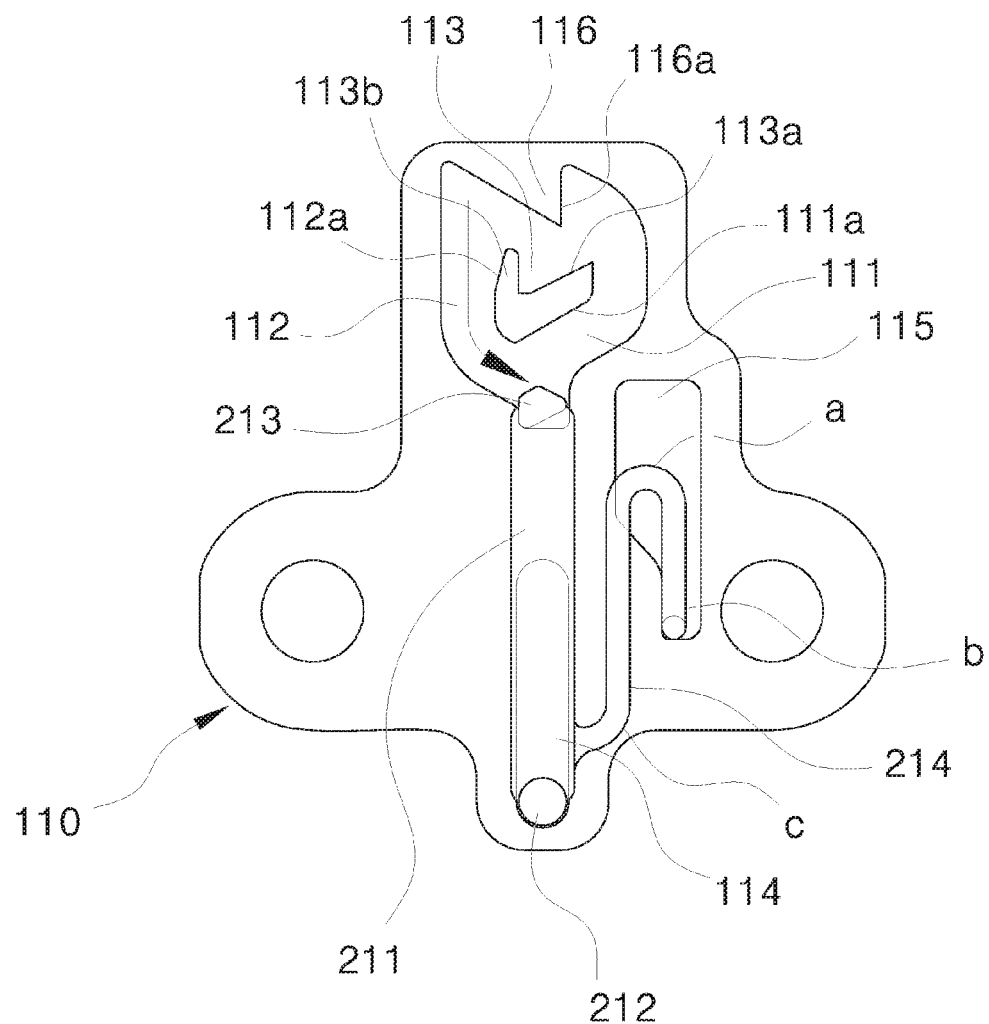
FIG. 12 is a view showing the stop protrusion that finishes the falling along the falling line according to the present invention.

FIG. 3 is a view showing the lifting body mounted in the fixing body, and FIG. 4 is a view showing the lifting body lifted as a fitting protrusion formed on one surface of a lifting plate is fitted into a fitting groove of the lifting body in the above mounting state between the lifting body and the fixing body.

As shown in drawings, the lifting body 200 is mounted in the fixing body 100, and the fixing body 100 may be assembled in a dividing state into equal parts. In the assembling state, the fixing body 100 has an opening 101 vertically formed therein and exposing a rotation groove 201 formed in the lifting body 200.

In addition, a rotation shaft 215, which protrudes from one surface of the lifting plate 211 constituting the actuation unit 210, is fitted into the rotation groove 201, which is rotatable, so that the rotation shaft 215 is movable while being fitted into the rotation groove 201.

FIGS. 5 to 12 are views showing a rising procedure of the actuation unit and the actuation guide unit as the lifting body is lifted, a stopping procedure in the rising state, and a falling procedure according to the releasing of the stopping state according to the present invention.

As shown in drawings, according to the present invention, the actuation unit 210 mounted in the lifting body 200 is lifted at the same time when the lifting body 200 is lifted and movably coupled to the lifting body 200 as described above. In addition, the actuation unit 210 includes the lifting plate 211 having both surfaces, the rotation shaft 215 protruding from one surface of the lifting plate 211 for fitting, and a stop protrusion 213 formed on an opposite surface of the lifting plate 211. The lifting body 200 is formed therein with the rotation groove 201 to be rotatably fitted around the rotation shaft 215 of the lifting plate 211, so that the rotation groove 201 is simply fitted around the rotation shaft 215 and movable left and right in the fitting state.

In order to stop the lifting body 200 in the state that the lifting body 200 is lifted, the lifting plate 211 constituting the actuation unit 210 and the stop protrusion 213, which is provided at an upper end of an opposite side of the lifting plate 211 to circulate between the lifting line 111 and the falling line 112 of the actuation guide unit 110 to be described below in detail, may protrude to the extent of being securely mounted in a stop groove 113 between the lifting line 111 and the falling line 112 of the actuation guide unit 110.

In this case, a lifting guide protrusion 212 is additionally provided at a lower end of the opposite surface of the lifting plate 211, and the lifting groove 114 is provided in a recess shape or a through-hole shape in the actuation guide unit 110 while extending vertically. Accordingly, the lifting guide protrusion 212 is lifted after being engaged with the lifting groove 114, so that the lifting of the lifting plate 211 is correctly guided immediately upward.

In this case, the stop protrusion 213 is prevented from interfering with the lifting groove 114. Accordingly, when the lifting plate 211 is lifted, and the stop protrusion 213 circulates between the lifting line 111 and the falling line 112 formed in the actuation guide unit 110, the lifting guide protrusion 212 is lifted in the lifting groove 114 to perform a hinge operation, so that the lifting of the lifting plate 211 can be correctly guided.

Although the lifting plate 211 shown with a predetermined area and both surfaces has been described above according to the present invention, the present invention is limited thereto.

In addition, as the lifting plate 211 is primarily pushed, the lifting of the lifting body 200 is started. In this case, the stop protrusion 213 is lifted along the lifting line, and mounted in the stop groove 113 after the lifting has been finished, so that the lifting body 200 is stopped in the lifting state. In this state, if the lifting plate 211 is lifted through the repeatedly pushing actions, the stop protrusion 213 deviates from the stop groove 113 to be released from the stopping state, and thus falls along the falling line 112.

In this case, an elastic rod 214 is provided at one side of the lifting plate 211 while being spaced apart from the lifting plate 211. The elastic rod 214 is coupled to a lower end of the lifting plate 211, and has a primarily curved shape c, and a shape a curved again at the top thereof, and a shape b of extending downward. Accordingly, the elastic rod 214 has sufficient elasticity.

The elastic rod 214 is provided at a front end thereof with a front protrusion 214a formed perpendicularly to the elastic rod 214 so that the front protrusion 214a circulates in contact with an elastic rod guide groove 115 of the actuation guide unit 110 to be described.

In addition, the actuation guide unit 110, which guides lifting when the lifting plate 211 and the elastic rod 214 of the actuation unit 210 are lifted, is provided in a plate shape and fixed to the fixing body 100, includes the lifting groove 114 vertically formed therein to vertically lift the lifting guide protrusion 212 of the lifting plate 211, and the elastic rod guide groove 115 provided at one side of the lifting groove 114 to lift the elastic rod 214, which is lifted together with the lifting plate 211 of the actuation unit, while circulating.

Immediately over the lifting groove 114, the lifting line 111 is formed to allow the stop protrusion 213 of the lifting plate 211 to be lifted while circulating as the lifting body 200 is lifted, the stop groove 113 is formed to stop the lifting of the stop protrusion 213, which is lifted, or to maintain the stopping stopping of the stop protrusion 213, and the falling line 112 is formed at one side of the stop groove 113 to allow the lifting body 200, the stopping state of which is released, to fall.

In order for the stop protrusion 213 to correctly enter the lifting line 111 in the case that the stop protrusion 213 is lifted for the circulation, the inclination line 111a having a slow inclination is formed at the side of the lifting line 111 on the bottom surface of the stop groove 113, and the stop protrusion 213 is located under the inclination line 111a.

In addition, the falling line 112 has a vertical line 112a sharply inclined to allow the stop protrusion 213 to rapidly deviate from the stop groove 113 when the stop protrusion 213 deviates from the stop groove 113.

In this case, the stop protrusion 213 is stopped in the stop groove 113 in the state that the elasticity of the elastic rod 214 is maintained, so that the stop protrusion 213 falls only along the falling line 112.

The repeatedly lifting and falling of the lifting body 200 performed through the repeat of pushing actions of the lifting body 200 may locate an elastic member 300 immediately over the lifting body 200 mounted in the fixing body 100.

In addition, when the stop protrusion 213 is lifted along the lifting line 111, the stop protrusion 213 is lifted in close contact with an opposite surface of one wing 113a forming the stop groove 113 and securely mounted and stopped in the stop groove 113 as the stop protrusion 213 deviates from the upper end of the opposite surface of the one wing 113a. In this case, in order to prevent the stop protrusion 213 from deviating from the stop groove 113 without being stopped in the stop groove 113 if the stop protrusion 213 is lifted at a rapid rate, an anti-passing protrusion 116 protrudes downward over the stop groove 113 while being spaced apart from the stop groove 113.

A front end 116a of the anti-passing protrusion 116 protruding downward is located in front of the stop groove 113. Accordingly, even if the stop protrusion 213 rapidly lifted along the lifting line 111 rapidly deviates from an upper end of one wing 113a forming the stop groove 113, the stop protrusion 213 is locked to the anti-passing protrusion 116 and dropped down in front of the stop groove 113, so that the stop protrusion 213 is correctly mounted in the sop groove 113.

The interval between the front end 116a of the anti-passing protrusion 116 and the front end of one side wing 113a forming the lifting line 111 with a predetermined length and forming the stop groove 113 is smaller than the thickness of the stop protrusion 213 formed on the lifting plate 211. Accordingly, the stop protrusion 213 enters the stop groove 113 through a lateral portion without deviating from the stop groove 113.

Alternatively, even if an opposite wing 113b forming the stop groove 113 and vertically erected is formed with a high height without the anti-passing protrusion 116 as described below, the stop protrusion may be prevented from deviating from the stop groove 113.

In this state, as the lifting body 200 is repeatedly pushed, the lifting body 200 is further lifted to immediately enter the falling line 112 as the elastic member 300 is pressed.

When the stop protrusion 213 is stopped in the stop groove 113, the elasticity is maintained by the elastic rod 214. Accordingly, if the lifting plate 211 is lifted according to the lifting of the lifting body 200 in the state that the stop protrusion 213 is securely mounted in the stop groove 113, the stop protrusion 213 is lifted from the stop groove 113 while entering the falling line 112 instead of the lifting line 111 as described above.

According to the present invention, the opposite wing 113b, which is another wing of the stop groove 113 forming the falling line 112, is formed at a right angle more substantially than an angle that the wing 113a of the lifting line 111 is spread, thereby preventing the stop protrusion from arbitrarily deviating from the stop groove 113 while rapidly entering the falling line.

In this case, instead of forming the anti-passing protrusion 116 to prevent the stop protrusion from deviating from the stop groove, the opposite wing 113b forming the stop groove 113 is formed with the height higher than that of the front end of the wing 113a of the lifting line 111 to prevent the stop protrusion from immediately entering the falling line 112. In this case, the allowable height of the opposite wing 113b must be in the range of pressing the elastic member 300.

Thereafter, the stop protrusion 213 is located in a stand-by groove 117 provided over the lifting groove 114 to be prevented from being fluctuated.

In addition, when the elastic rod 214 is lifted for the circulation, the front end protrusion 214a formed on the front end of the elastic rod 214 is inclined as the lifting plate 211 is moved along the inclination line 111a, which is slowly inclined. Accordingly, the curved elastic rod 214 is pressed, and the stop protrusion is securely mounted in the stop groove 113 in this state.

Thereafter, if repeatedly pushing actions are performed, the stop protrusion 213 is lifted to enter the falling line 112 instead of the lifting line 111 by the elastic rod 214, so that the stop protrusion 213 become out of the 113b of the stop groove 113.

Therefore, the stop protrusion 213 exactly performs repeated actions while circulating between the lifting line 111 and the falling line 112 according to the lifting and the falling of the lifting body 200.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A locking-unlocking structure for stopping a lifting body, which is vertically lifted and falls through repetition of a pushing action, in a lifting state and for releasing a stopping state of the lifting body, the locking-unlocking structure comprising:

a lifting body, which is exactly lifted immediately upward, or falls without being fluctuated left and right, wherein, to control lifting and falling operations of the lifting body, an actuation unit is mounted in the lifting body movably left and right, and an actuation guide unit, which guides an operation of the actuation unit, is fixedly mounted in a fixing body, and wherein the lifting body is provided therein with a rotation groove allowing the actuation unit to be movable left and right when the lifting body is lifted or falls; and a rotation shaft rotatably coupled to the rotation groove is provided at one side of a lifting plate, wherein the lifting plate is provided on a lower end of an opposite side thereof with a stop protrusion circulating a lifting line and a falling line branching left and right, wherein the actuation guide unit, which is configured to guide an operation of the actuation unit, includes the lifting line having a rising curve line and the falling line having a falling curve line, the lifting line and the falling line branching left and right at a lower end of the actuation guide unit, to guide repeatedly circulating operations of the actuation unit, and wherein the actuation guide unit is provided at a central upper portion thereof with a stop groove interposed between the lifting line and the falling line to securely mount the stop protrusion in the stop groove.

2. The locking-unlocking structure of claim 1, further comprising:
a lifting guide protrusion on the lifting plate constituting the actuation unit immediately under the stop protrusion,
wherein the actuation guide unit is provided therein with a lifting groove for lifting and falling of the lifting guide protrusion.

3. The locking-unlocking structure of claim 1,
wherein the lifting plate is provided at one side thereof with an elastic rod, and
wherein the actuation guide unit is formed therein with an elastic rod guide groove to be engaged with the elastic rod.

4. The locking-unlocking structure of claim 2,
wherein the lifting plate is provided at one side thereof with an elastic rod, and
wherein the actuation guide unit is formed therein with an elastic rod guide groove to be engaged with the elastic rod.

5. The locking-unlocking structure of claim 3, wherein the elastic rod is mounted on a lower end of the lifting plate to have a curved shape (a) at a top of the elastic rod and a shape (b) of extending downward such that elasticity is maintained in the lifting operation.

6. The locking-unlocking structure of claim 3, wherein the elastic rod mounted at one side of the lifting plate is provided at a front end thereof with a front end protrusion to move in close contact with an inner wall of the elastic rod guide groove.

7. The locking-unlocking structure of claim 1, wherein the stop groove is erected at a portion, in which the falling line is formed, more than a portion in which the lifting line is formed to prevent deviation from the stop groove.

8. The locking-unlocking structure of claim 1, further comprising an anti-passing protrusion provided over the stop groove and having a front end to guide locking.

9. The locking-unlocking structure of claim 6, further comprising an anti-passing protrusion provided over the stop groove and having a front end to guide locking.

10. The locking-unlocking structure of claim 1, wherein an inclination surface forming the lifting line is located immediately over the stop protrusion such that the stop protrusion is lifted only along the lifting line when circulating.

11. The locking-unlocking structure of claim 6, wherein an inclination surface forming the lifting line is located immediately over the stop protrusion such that the stop protrusion is lifted only along the lifting line when circulating.

12. The locking-unlocking structure of claim 4, wherein the elastic rod is inclined and pressed by the elastic rod guide groove when the stop protrusion moves along an inclination surface of the lifting line.

13. The locking-unlocking structure of claim 7, wherein the front end of the anti-passing protrusion is located in front of the stop protrusion.

14. The locking-unlocking structure of claim 2,
wherein the lifting groove includes a linear part, and
wherein the lifting guide protrusion is lifted only along the linear part such that the stop protrusion is lifted only along the lifting line.

* * * * *